No. 734,493. PATENTED JULY 21, 1903.
E. HORNADAY & W. J. CORNER.
COLLAPSIBLE, FOLDING, AND ADJUSTABLE CRATE.
APPLICATION FILED OCT. 6, 1902.
NO MODEL.
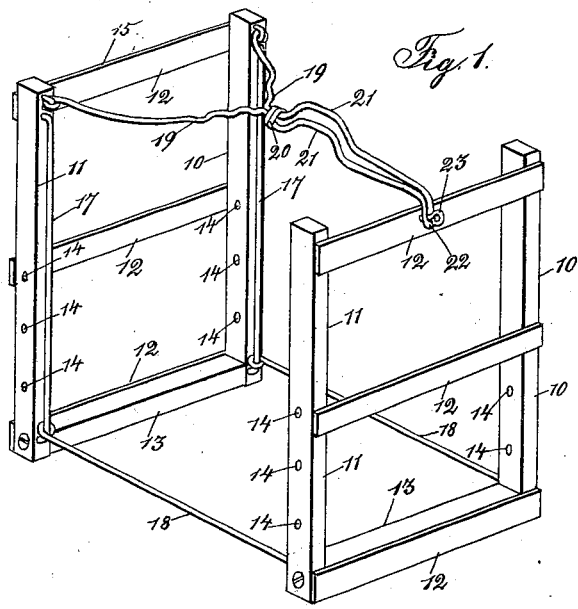
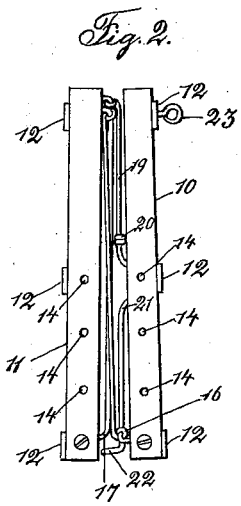
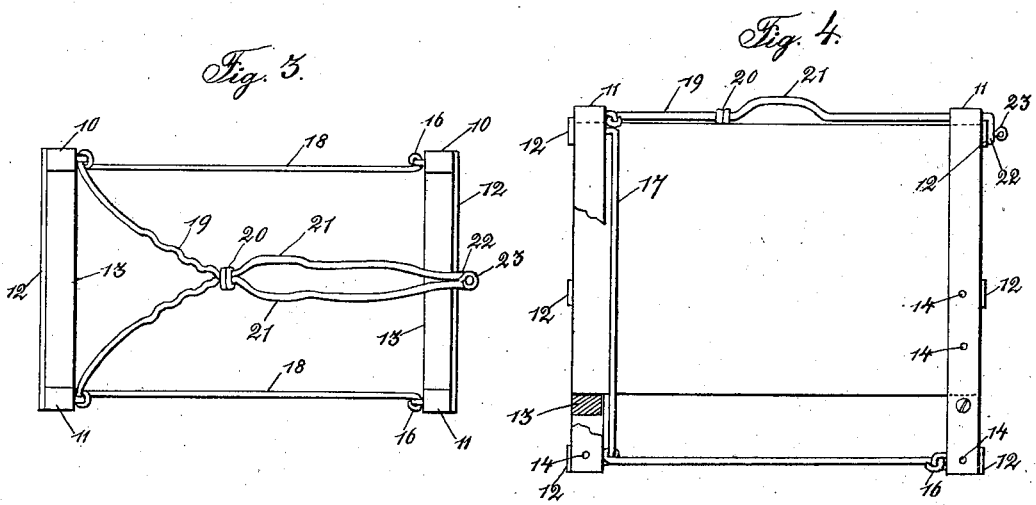
Witnesses:
Henry Manger.
L. L. Leibrock.
Inventors: E. Hornaday and W. J. Corner.
by Orwig & Lane Attys.

No. 734,493. Patented July 21, 1903.

UNITED STATES PATENT OFFICE.

EDSON HORNADAY AND WILLIAM JASON CORNER, OF COLFAX, IOWA.

COLLAPSIBLE, FOLDING, AND ADJUSTABLE CRATE.

SPECIFICATION forming part of Letters Patent No. 734,493, dated July 21, 1903.

Application filed October 6, 1902. Serial No. 126,261. (No model.)

*To all whom it may concern:*

Be it known that we, EDSON HORNADAY and WILLIAM JASON CORNER, citizens of the United States, residing at Colfax, in the county of Jasper and State of Iowa, have invented a certain new and useful Collapsible, Folding, and Adjustable Crate, of which the following is a specification.

The objects of our invention are to provide a box-crate of simple, durable, and inexpensive construction which will be sufficient protection for the ordinary tin box with glass front which is used in shipping cookies and the like.

A further object is to provide a box-crate the retaining portion of which can be made adjustable as to size, and thus allow the shipper to adjust portions of the crate so that any size of box may be crated.

A further object is to provide a crate which can be easily and readily folded and when in its closed position it will occupy a minimum amount of space.

A further object is to provide a bail for the top of our device which can be easily and readily seated to the front portion of the crate, so that the contents of the box which is incased in our crate cannot be tampered with.

A further object is to provide a bail which can also be used as a handle which can be used in moving our crate from one place to another.

Our invention consists in certain details in the construction, arrangement, and combination of the various parts of the device whereby the objects contemplated are attained, as hereinafter more fully set forth, pointed out in our claims, and illustrated in the accompanying drawings, in which—

Figure 1 is a perspective view of the complete device. Fig. 2 is a side elevation of our device in its closed position. Fig. 3 is a top or plan view of our complete device, and Fig. 4 is a side elevation of our device with the box in position in the crate and a portion of one of the uprights in the crate cut away to show the way in which the box rests upon the adjustable supports.

Referring to the accompanying drawings, we have used the reference-numerals 10 and 11 to indicate two upright posts in the front end of our crate. Said upright posts are connected by the horizontal slats 12, said slats being on the exterior front portion of the uprights 10 and 11. Between the lower inner portions of the uprights 10 and 11 and at the rear of the slats 12 we have provided an adjustable support 13, said support being held in place firmly between the upright posts 10 and 11 by means of screws. In each of the upright posts 10 and 11 we have provided a series of openings 14, so arranged that when the screws near the ends of the adjustable support 13 are removed the support can be raised or lowered and the screws can be inserted into the openings 14, and thus allow the adjustable support to be raised or lowered at the pleasure of the operator. We have provided a rear end portion 15, comprising the same parts as the front portion, and it is arranged substantially like the front portion, except that the slats 12 are placed on the rear portion of the uprights 10 and 11. The adjustable supports 13 and the uprights 10 and 11 are so arranged that a box can be placed upon the top of the adjustable supports 13 and between the sides 10 and 11 of both the front and rear ends of our crate. It will be seen that the boxes will then rest against the slats 12 of both the front and rear portions.

Near the lower end of the upright posts 10 and 11 of the front portion of our frame we have mounted the staples 16. In the uprights 10 and 11 of the rear frame we have mounted the rods 17, said rods being substantially parallel with the face of the uprights 10 and 11, to which they are attached. The body portion of these rods is a slight distance away from the face of the uprights 10 and 11, to which they are attached. To the staples 16 we have attached the rods 18, which connect these staples with the rods 17, upon which the ends of the rods 18 are slidingly mounted at the end opposite to that which is attached to the staples 16, so that when the front portion of the frame is pushed rearwardly and the rear end of the rods 18 are pushed upwardly they will slide upwardly on the rods 17, and thus allow the front portion of the frame to approach the rear portion of the frame and finally reach the position shown in Fig. 2 of the drawings.

We have provided a wire bail 19, comprising a single piece of wire, the ends of which are drawn together until they overlap each other and their rear ends extend some distance apart. These rear ends are pivotally mounted to the upright posts 10 and 11, respectively, of the rear end of the crate. The rear end portion of the wire bail 19 is held in this position by means of the sleeve 20, and this sleeve is made adjustable, so that by pushing the sleeve rearwardly the entire bail 19 will be shortened on account of the wire being so bent that the rear end portions cross each other, and as the sleeve is moved forwardly the bail will be lengthened slightly near the central portion of the bail. We have bent both portions of the wire upwardly at 21 to form a handle in said bail. The forward end of the bail is bent substantially at right angles to the body portion thereof, so that when the bail rests against the top portion of the upper slat 12 in the front portion of the frame the projection 22, which has been bent at right angles to the body portion of the bail, will overlap the upper slat 12, and said projection will allow the screw-eye 23 to be received between the side portions of it, and the forward ends of the bail can be locked relative to the forward end of the crate by means of this arrangement.

In practical use and assuming that the portions of the crate are in the position shown in Fig. 1 of the drawings the shipper removes the forward ends of the bail from the screw-eye 23 and draws the forward end of said bail upwardly and rearwardly on its pivot. He then places the box which he desires to ship on the adjustable supports 13 and between the posts 10 and 11 in the front and rear end of the frame. He then swings the forward end of the bail downwardly and forwardly and hooks it over the screw-eye 23 and secures the bail in that position. The box is then crated ready for shipping, and it will be seen by this arrangement that the box cannot slip in any direction relative to the frame and an absolutely safe crate is provided.

Assuming that the box is substantially less in height than the distance between the upper surface of the adjustable supports 13 when this support is in the position shown in Fig. 1 and the under surface of the bail 19, the operator removes the screws in the adjustable supports 13 from them and raises the supports upwardly to a position between any of the openings 14 in the uprights 10 and 11, provided both ends of the adjustable supports 13 are raised the same distance. The screws are then inserted into the openings 14 which are nearest the adjustable support, and the shipper retains the supports in the position desired by means of these screws. If the operator desires to lessen the distance between the front and rear portion of the crate, he can do so by simply bending the rods 18 at a different point, and thus shorten them. Thus the front and rear portion of the crate will be nearer together. The bail can be shortened in the same way. When the box has been removed from the crate and it is desired to ship simply the crate, the shipper raises the forward end of the bail a slight distance and then allows it to swing downwardly against the rear portion of the crate. He then pushes the forward portion of the crate in a direction toward the rear portion thereof and pushes the rear ends of the rods 18 upwardly, so that they will slide on the rods 17, and the crate will soon be in its closed position, as shown in Fig. 2 of the drawings.

Having thus described our invention, what we claim, and desire to secure by Letters Patent of the United States therefor, is—

1. In a crate, the combination of a front portion, a rear portion, horizontal slats on the exterior of said front and rear portions, adjustable supports mounted in said front and rear portions, connecting-rods pivotally mounted at one end to the front portion and slidingly attached at their other end to the rear portion, a bail for holding the front and rear portions of the frame in position relative to each other, for the purposes stated.

2. In a crate, the combination of a front portion, slats at the forward end of said front portion, a screw-eye in the upper of said slats, an adjustable support in said front portion, a rear portion, slats at the rear of said rear portion, a vertically-adjustable support in said rear portion, connecting-rods between said front portion and said rear portion so arranged that the front and rear portions can be drawn toward each other, a bail pivotally attached to the rear portion for engaging the screw-eye on the front portion and hold the front and rear portions relative to each other, for the purposes stated.

3. In a crate, the combination of a front portion, slats at the forward end of said front portion, a screw-eye in the upper of said slats, an adjustable support in said front portion, a rear portion, slats at the rear of said rear portion, a vertically-adjustable support in said rear portion, connecting-rods between said front portion and said rear portion so arranged that the front and rear portions can be drawn toward each other, a bail pivotally mounted on the rear portion for engaging the screw-eye on the front portion and hold the front and rear portions relative to each other, means for shortening and lengthening the bail, for the purposes stated.

4. In a crate, the combination of a front portion, a rear portion, connecting-rods pivotally attached at one end to the front portion and slidingly attached at their other end to the rear portion, a bail attached to one of said portions at one end and designed to engage the other of said portions at the other end of said bail, for the purposes stated.

5. In a crate, the combination of a front portion, a rear portion, connecting-rods pivotally and slidingly mounted between said portions, a bail for holding the front and rear portions in position relative to each other.

6. In a crate, the combination of a front portion, a rear portion, connecting-rods between said front portion and said rear portion designed to hold the front and rear portions in position relative to each other at their lower ends and also to allow the front and rear portions to be drawn toward each other by slidingly mounting the rear ends of said connecting-rods, and pivotally mounting the front ends of them, a bail pivotally attached to the rear portion and designed to hold the front and rear portions in position relative to each other at their top portions.

7. In a device of the class described, the combination of a front portion, a rear portion, rods attached to said rear portion, connecting-rods pivotally attached to said front portion and slidingly mounted on the rods which are attached to the rear portion, a bail pivotally attached to said rear portion and capable of being attached to the front portion, for the purposes stated.

8. In a device of the class described, the combination of a front portion, a rear portion, rods attached to said rear portion, connecting-rods attached to said front portion and slidingly mounted on the rods which are attached to the rear portion, a bail attached to said rear portion and capable of being attached to the front portion, for the purposes stated.

EDSON HORNADAY.
WILLIAM JASON CORNER.

Witnesses:
B. F. WINTERSTEEN,
EVERET M. ALLEN.